United States Patent [19]

Ishikawa et al.

[11] Patent Number: 5,784,053
[45] Date of Patent: Jul. 21, 1998

[54] TWO-DIMENSIONAL PATTERN DIGITIZER

[75] Inventors: Mamoru Ishikawa, Fuji; Masashi Suzuki; Yasuhiro Seki, both of Mishima, all of Japan

[73] Assignee: Kabushiki Kaisha TEC, Shizuoka, Japan

[21] Appl. No.: 493,120

[22] Filed: Jun. 20, 1995

[30] Foreign Application Priority Data

Jun. 22, 1994 [JP] Japan ................................ 6-140116
May 15, 1995 [JP] Japan ................................ 7-115863

[51] Int. Cl.$^6$ .......................... G09G 3/02; G08C 21/00
[52] U.S. Cl. .................. 345/174; 178/18; 178/19; 341/139; 341/158; 341/172
[58] Field of Search .................. 178/18, 19; 345/174, 345/173; 341/139, 132, 120, 158, 172

[56] References Cited

U.S. PATENT DOCUMENTS

| | | | |
|---|---|---|---|
| 3,591,718 | 7/1971 | Asano | 178/19 |
| 3,918,050 | 11/1975 | Dorsman | 341/158 |
| 4,103,234 | 7/1978 | Frazier | 341/139 |
| 4,297,680 | 10/1981 | Koeman | 341/158 |
| 4,717,793 | 1/1988 | Kobayashi | 178/18 |
| 4,901,078 | 2/1990 | Goyal | 341/139 |
| 5,010,346 | 4/1991 | Hamilton et al. | 341/137 |
| 5,121,119 | 6/1992 | Higuchi | 341/120 |
| 5,159,340 | 10/1992 | Smith | 341/132 |

*Primary Examiner*—Steven J. Saras
*Assistant Examiner*—Vijay Shankar
*Attorney, Agent, or Firm*—Frishauf, Holtz, Goodman, Langer & Chick

[57] ABSTRACT

A digitizer includes a reference level generator for generating a reference level, a comparator for comparing a signal level of the analog input with the reference level to provide a digitized output, a first detecting circuit for detecting a moderate change in the signal level of the analog input so as to change the reference level in accordance with the detected moderate change in the signal level of the analog input, and a second detecting circuit for detecting a rapid change in the signal level of the analog input so as to change the reference level in accordance with the detected rapid change in the signal level of the analog input.

14 Claims, 6 Drawing Sheets

TWO-DIMENSIONAL PATTERN DIGITIZER

BACKGROUND OF THE INVENTION

1. Field of the Invention

The present invention relates to a digitizer for converting an analog input into a digitized or binary signal.

2. Description of the Related Art

According to a scanner for reading a two-dimensional code formed of a black/white pattern, a read signal obtained by scanning is digitized with a fixed reference level by a conventional digitizer and converted into a detection signal having two signal levels respectively corresponding to the black and white portions of the black/white pattern.

If the two-dimensional code is irregularly lighted so as to result in level variations in (or lower the average level of) the scanned read signal, since the reference level of the above digitizer is fixed, the signal width of one portion (white signal portion) is narrowed while the other portion (black signal portion) is widened. This causes an inaccurate digitization of the black/white pattern.

SUMMARY OF THE INVENTION

It is accordingly an object of the present invention to provide a digitizer for accurately digitizing a two-dimensional pattern even when the pattern is subjected to irregular lighting.

To achieve the above object, a digitizer of the present invention comprises a reference level generator for generating a reference level; a comparator for comparing a signal level of the analog input with the reference level to provide a digitized output; a first detecting circuit for detecting a moderate change in the signal level of the analog input so as to change the reference level in accordance with the detected moderate change in the signal level of the analog input; and a second detecting circuit for detecting a rapid change in the signal level of the analog input so as to change the reference level in accordance with the detected rapid change in the signal level of the analog input.

DETAILED DESCRIPTION OF THE PREFERRED EMBODIMENTS

In the following the preferred embodiments of the present invention will be described with reference to the accompanying drawings.

Figure 1:
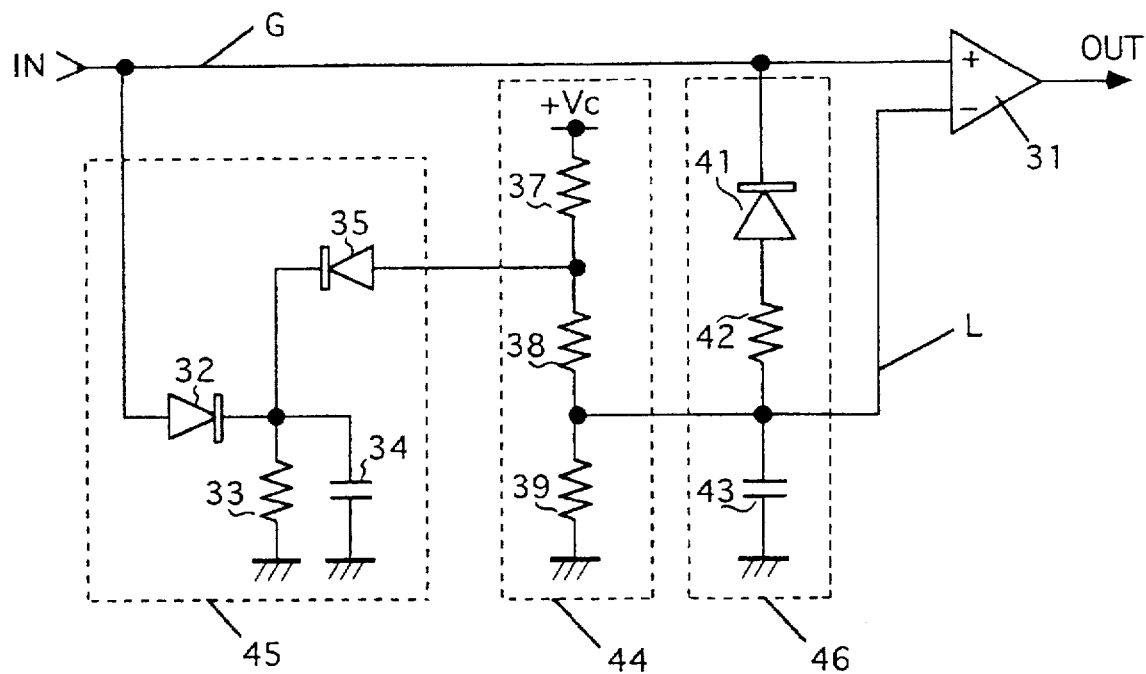
FIG. 1 is a circuit diagram of a digitizer according to a first embodiment of the invention.

FIG. 1 is a circuit diagram of a digitizer according to a first embodiment of the invention.

Detection signal G from a two-dimensional scanner (not shown) is applied to input node IN. Such a two-dimensional scanner can be obtained by prior art. Examples of the two-dimensional code scanner are disclosed in:

(1) European Patent Application Publication No. 0 385 478 A2 "BAR CODE READER" (Boris et al.);

(2) Japanese Patent Application Disclosure No. 5-298469 "IMAGE READING APPARATUS" (Suzuki et al.);

(3) Japanese Patent Application Disclosure No. 6-139397 "TWO-DIMENSIONAL CODE SCANNER" (Uchimura et al.);

(4) Japanese Patent Application Disclosure No. 6-139398 "TWO-DIMENSIONAL CODE SCANNER" (Suzuki et al.);

(5) Japanese Patent Application Disclosure No. 6-139399 "TWO-DIMENSIONAL CODE SCANNER" (Suzuki et al.); and (6) Japanese Patent Application Disclosure No. 6-266876 "TWO-DIMENSIONAL CODE SCANNER" (Suzuki et al.).

Detection signal G is sent to the non-inverted input of comparator 31 and to the anode of diode 32. The cathode of diode 32 is connected to one terminal of resistor 33. The other terminal of resistor 33 is circuit-grounded. Capacitor 34 is parallel connected to resistor 33.

The parallel circuit of capacitor 34 and resistor 33 constitutes an integration circuit or a first low-pass filter. The first low-pass filter is provided for ensuring a change in the level of reference signal L of comparator 31 in accordance with a relatively low-frequency component of the detection signal.

Note that the time constant of the first low-pass filter (capacitor 34 and resistor 33) is specifically selected so that the filter is insensitive to a rapid change in the level of detection signal G which occurs at each boundary between the black and white portions of the scanned pattern, and that the filter is sensitive to a moderate change in the level of detection signal G.

The node between capacitor 34 and the cathode of diode 32 is connected to the cathode of diode 35. The anode of diode 35 is connected to the node between resistors 37 and 38. The other node of resistor 37 is connected to a circuit of positive power supply Vc. The other node of resistor 38 is connected, via resistor 39, to the circuit ground.

Detection signal G is also sent to the cathode of diode 41. The anode of diode 41 is connected, via resistor 42, to the node between resistors 38 and 39. Capacitor 43 is parallel connected to resistor 39.

The parallel circuit of capacitor 43 and resistor 39 constitutes another integration circuit or a second low-pass filter. The second low-pass filter is provided for ensuring a change in the level of reference signal L of comparator 31 in accordance with a relatively high-frequency component of the detection signal.

Note that the time constant of the second low-pass filter (capacitor 43 and resistor 39) is specifically selected so that reference signal L can respond to the rapid level change in the detection signal at the boundary between the black and white portions of the scanned pattern, and so that the filter can absorb extra higher frequency noises mixed in the detection signal.

Reference signal L of comparator 31 is obtained from the connection node between resistor 39 and capacitor 43, and is supplied to the inverted input of comparator 31.

The circuit elements 37–39 constitute reference voltage generator 44. The circuit elements 32–35 constitute first reference voltage changer 45. The circuit elements 41–43 constitute second reference voltage changer 46.

Figure 2:
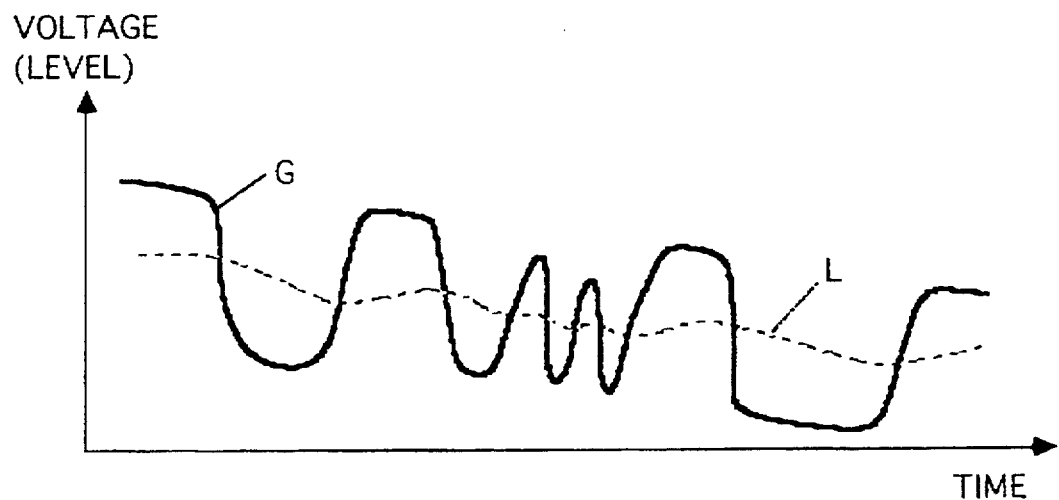
FIG. 2 illustrates an example of level variations in the digitizer input and the reference signal of digitizing.
Figures 3, 4:
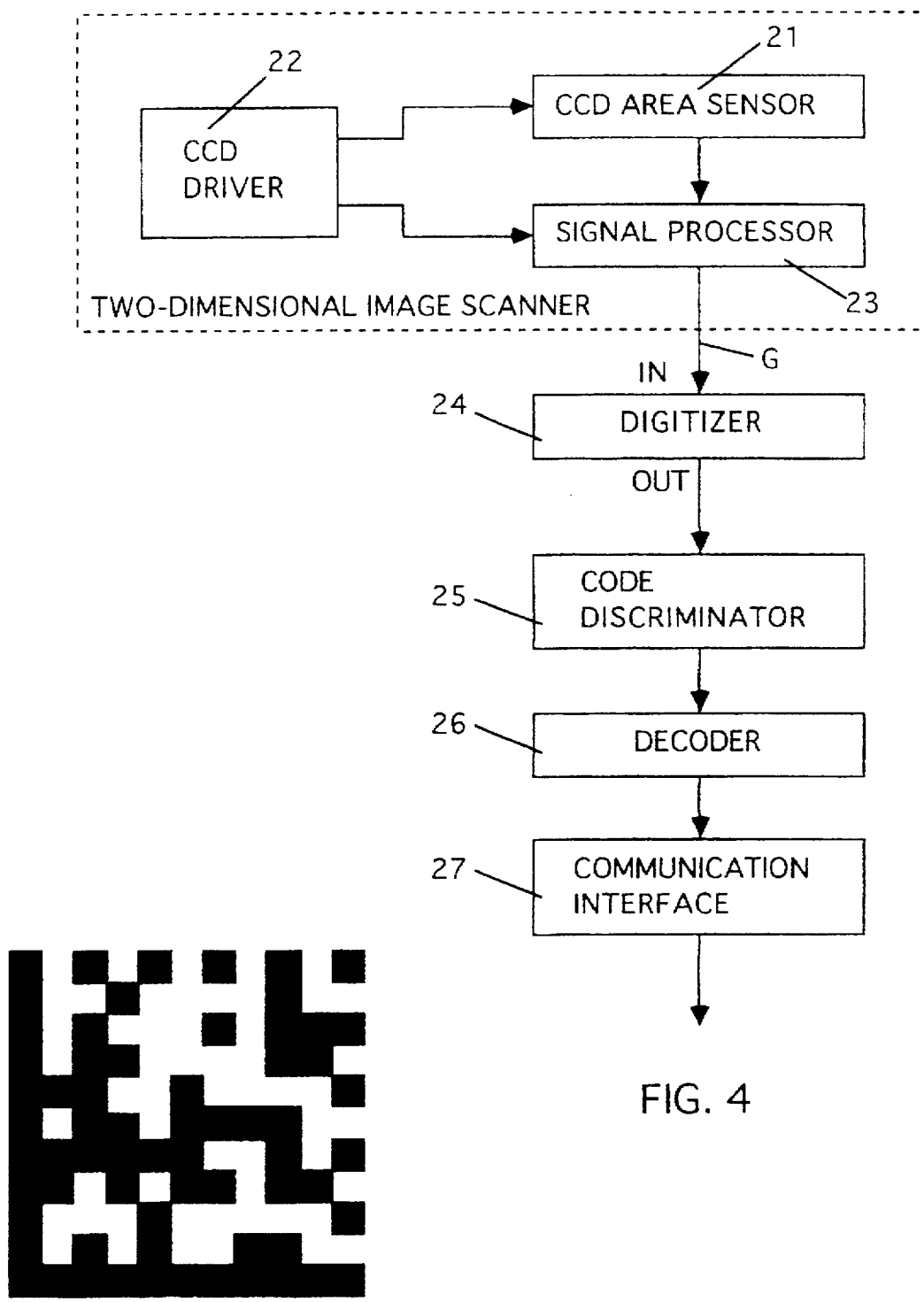
FIG. 3 illustrates an example of a two-dimensional code formed of a black/white pattern.
FIG. 4 is a block diagram of a scanner for reading the two-dimensional code as shown in FIG. 3.

FIG. 3 illustrates an example of a two-dimensional code formed of a black/white pattern. FIG. 2 illustrates an example of level variations in detection signal (digitizer input) G and reference signal L.

Comparator 31 compares the signal level of detection signal G, applied at input node IN, with reference signal L obtained from capacitor 43. When the detection signal level exceeds the reference signal level, comparator 31 provides a high level output corresponding to the white portion of the scanned pattern as shown in FIG. 3. When the detection signal level does not exceed the reference signal level, comparator 31 provides a low level output corresponding to the black portion of the scanned pattern.

As shown in FIG. 2, the level (voltage potential) of reference signal L varies in proportion to the broad (or moderate) change in the level of detection signal G, but varies only slightly in response to the rapid level change in detection signal G.

More specifically, when the two-dimensional code pattern as shown in FIG. 3 is irregularly lighted, or when the sheet on which the two-dimensional code pattern is printed becomes dirty or unclean, detection signal G changes gradually to lower its level. This means that the change in the level of signal G contains a relatively low frequency component.

Since the time constant of the first low-pass filter (resistor 33 and capacitor 34) is so selected that the above low frequency change of signal G is not filtered out, the level (voltage potential) at the node between resistors 37 and 38 gradually lowers. Then, the level of reference signal L, derived from the node between resistors 38 and 39, correspondingly lowers (low frequency change).

Similarly, when the level of detection signal G gradually rises due to an irregular illumination, the level at the node between resistors 37 and 38 gradually rises. Then, the level of reference signal L correspondingly rises (low frequency change).

If the level at the anode of diode 35 rises up to the potential at the node between resistors 37 and 38, diode 35 becomes reversely biased so that it is cut-off. In this case, reference voltage generator 44 is no longer affected by first reference voltage changer 45.

Meanwhile, when the level of detection signal G rapidly lowers at the boundary between the white and black portions of the scanned pattern (from the white portion to the black portion), the detection signal G level (potential) falls under the reference signal L level (potential). In this case, diode 41 is forwardly biased by the potential difference between signals G and L and becomes conductive. Then, the potential at capacitor 43 (=signal L level) lowers in response to the level down of signal G.

Similarly, when the level of detection signal G rapidly rises at the boundary between the white and black portions of the scanned pattern (from the black portion to the white portion), the detection signal G level (potential) exceeds the reference signal L level (potential). In this case, diode 41 is reversely biased by the potential difference between signals G and L and is turned off. Then, the potential at capacitor 43 (=signal L level) returns to the potential obtained by voltage-dividing the power supply potential of +Vc by the series resistors 37–39.

According to the embodiment of FIG. 1, first reference voltage changer 45 responds to the moderate (low frequency) change in detection signal G and changes the level of reference signal L so that the signal L level follows the low frequency change in the level of signal G. In addition, according to the embodiment of FIG. 1, second reference voltage changer 46 responds to the rapid (high frequency) change in detection signal G and changes the level of reference signal L so that the signal L level follows the high frequency change in the level of signal G.

Further, according to the embodiment of FIG. 1, when the level of detection signal G becomes high, diode 35 is reversely biased (diode 35 is cut off) so that reference voltage generator 44 is electrically disconnected from first reference voltage changer 45. Thus, the level of reference signal L is prevented from being unnecessarily close to the level of signal G.

Still further, according to the embodiment of FIG. 1, even if the level of detection signal G becomes low due to a long continuous black portion of the scanned pattern, since resistor 42 is connected in series to diode 41, reference signal L at the node between resistors 39 and 42 is not reduced to a level lower than the low level of detection signal G.

In short, according to the embodiment of FIG. 1, since the level of reference signal L can change dynamically in response to the moderate and rapid changes in detection signal G, it is possible to accurately detect the widths of black and white portions in the scanned two-dimensional pattern as shown in FIG. 3.

FIG. 4 is a block diagram of a scanner for reading the two-dimensional code as shown in FIG. 3.

Area sensor 21 is formed of a two-dimensional charge coupled device (hereinafter referred to as "CCD") in which many CCD elements are arranged in a matrix fashion. The imaging operation of area sensor 21 is controlled by CCD driver 22. More specifically, the horizontal/vertical scan (or read) timings of area sensor 21 are controlled by the horizontal and vertical sync signals from driver 22, and the charges corresponding to the optical pattern of two-dimensional code are sequentially read.

An image data signal of the sequentially read charges is supplied from area sensor 21 to signal processor 23. Signal processor 23 amplifies and shapes the supplied image data signal, and finally outputs detection signal (video signal) G.

A two-dimensional image reader (scanner) of this embodiment is formed by elements 21–23.

Detection signal G from signal processor 23 is input to digitizer 24 having a circuit configuration as shown in FIG. 1. Digitizer 24 digitizes signal G having an analog waveform as shown in FIG. 2 and outputs a binary signal having two logical levels respectively corresponding to the black and white portions of the pattern read by area sensor 21. The binary signal is supplied to code discriminator 25.

Code discriminator 25 has an image database. In discriminator 25, the image database is searched using a key obtained from a reconstructed image of the supplied binary signal. When a specific image matched to the key is found, a code linked to the found specific image is extracted from the database and the extracted code is supplied to decoder 26.

Decoder 26 decodes the image of the supplied code according to a preset algorithm to provide code data. The code data thus obtained is converted into communication data in communication interface 27, and the converted communication data is then sent to a data processing apparatus or host computer wherein the sent data is properly used.

Except for digitizer 24, the elements (21–23 and 25–27) can be obtained by prior art. The configuration of digitizer 24 may be one as shown in FIG. 1 or 5.

Figure 5:
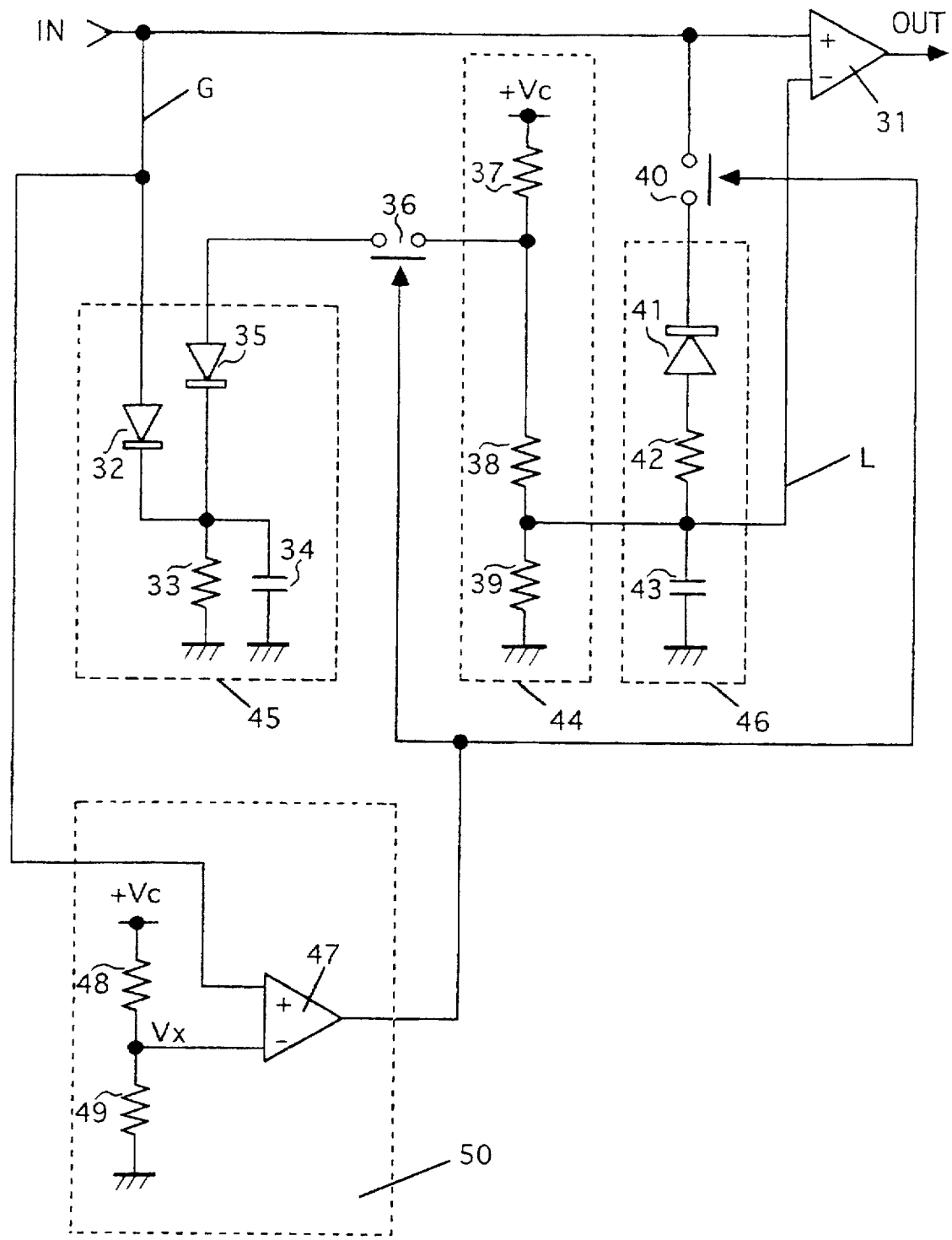
FIG. 5 is a circuit diagram of a digitizer according to a second embodiment of the invention.

FIG. 5 is a circuit diagram of a digitizer according to a second embodiment of the invention.

The circuit configuration of FIG. 5 differs from that of FIG. 1 in that diode 35 is selectively connected to reference voltage generator 44 via switch 36, in that diode 41 is selectively connected to the signal line of input node IN (=non-inverted input of comparator 31) via switch 40, and in that the on/off of switches 36 and 40 is controlled by voltage change detector 50. Each of switches 36 and 40 is formed by a semiconductor switch such as a field effect transistor or a bipolar transistor.

Voltage change detector 50 is formed of comparator 47 whose non-inverted input is connected to input node IN, and whose inverted input receives voltage Vx. Voltage Vx is obtained from the node between series-connected resistors 48 and 49. Resistor 48 is connected to the +Vc power supply circuit and resistor 49 is connected to the circuit ground. Voltage Vx can be freely determined according to the voltage-dividing ratio of a voltage divider constituted by resistors 48 and 49.

If the magnitude of detection signal G becomes large and the voltage potential of signal G exceeds voltage Vx, comparator 47 supplies a high level signal to switches 36 and 40, so that these switches are turned on (electrically conductive). In this case, the circuit of FIG. 5 is functionally equivalent to that of FIG. 1.

Meanwhile, when the magnitude of detection signal G is relatively small and the voltage potential of signal G does not exceed voltage Vx, comparator 47 supplies a low level signal to switches 36 and 40, so that these switches are turned off (electrically non-conductive). In this case, the function of first and second reference voltage changers 45 and 46 are disabled, and the circuit of FIG. 5 simply serves as a conventional digitizer with a fixed reference level (L).

Figure 6:
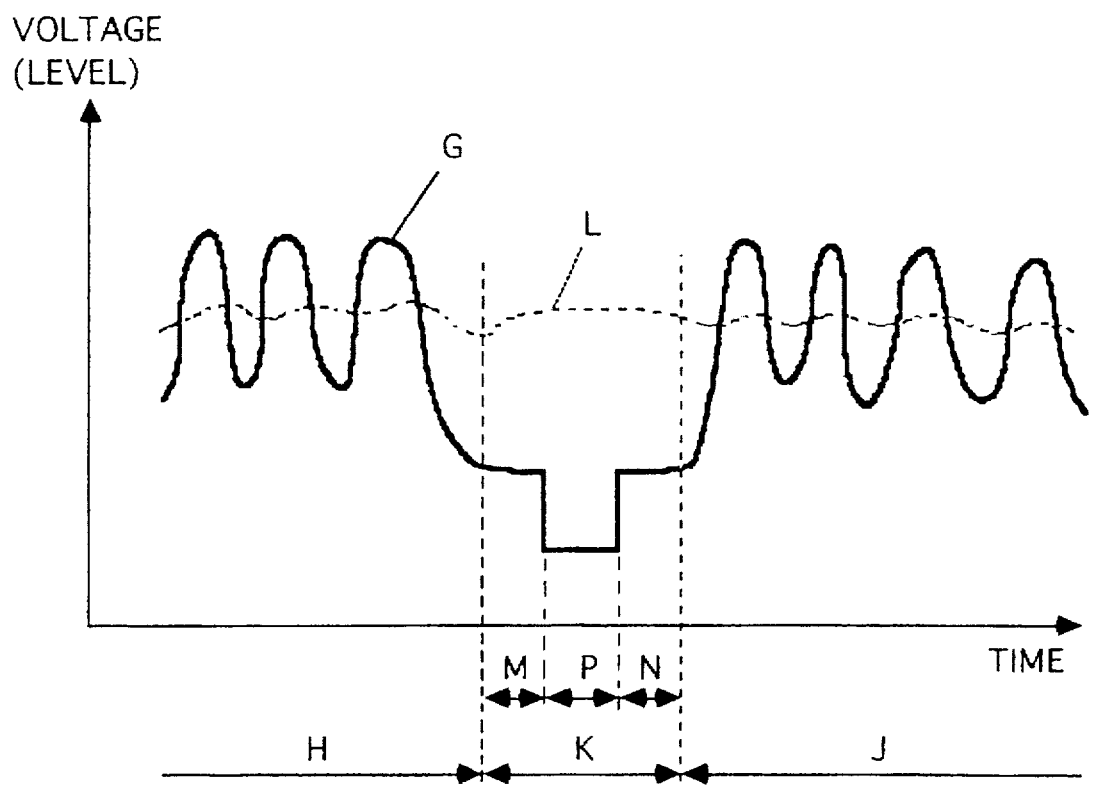
FIG. 6 illustrates another example of level variations in the digitizer input and the reference signal of digitizing.
Figure 9:
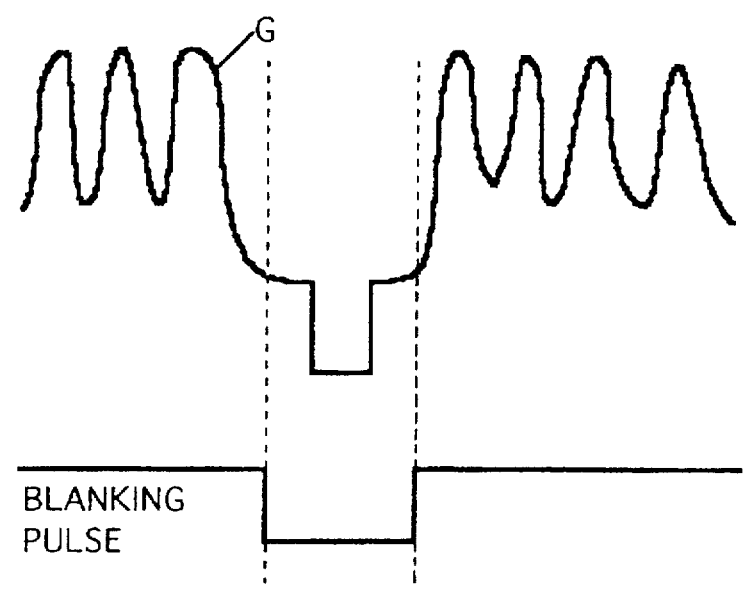
FIG. 9 illustrates a relation between the timing of a detection signal and that of a blanking pulse.
Figure 7:
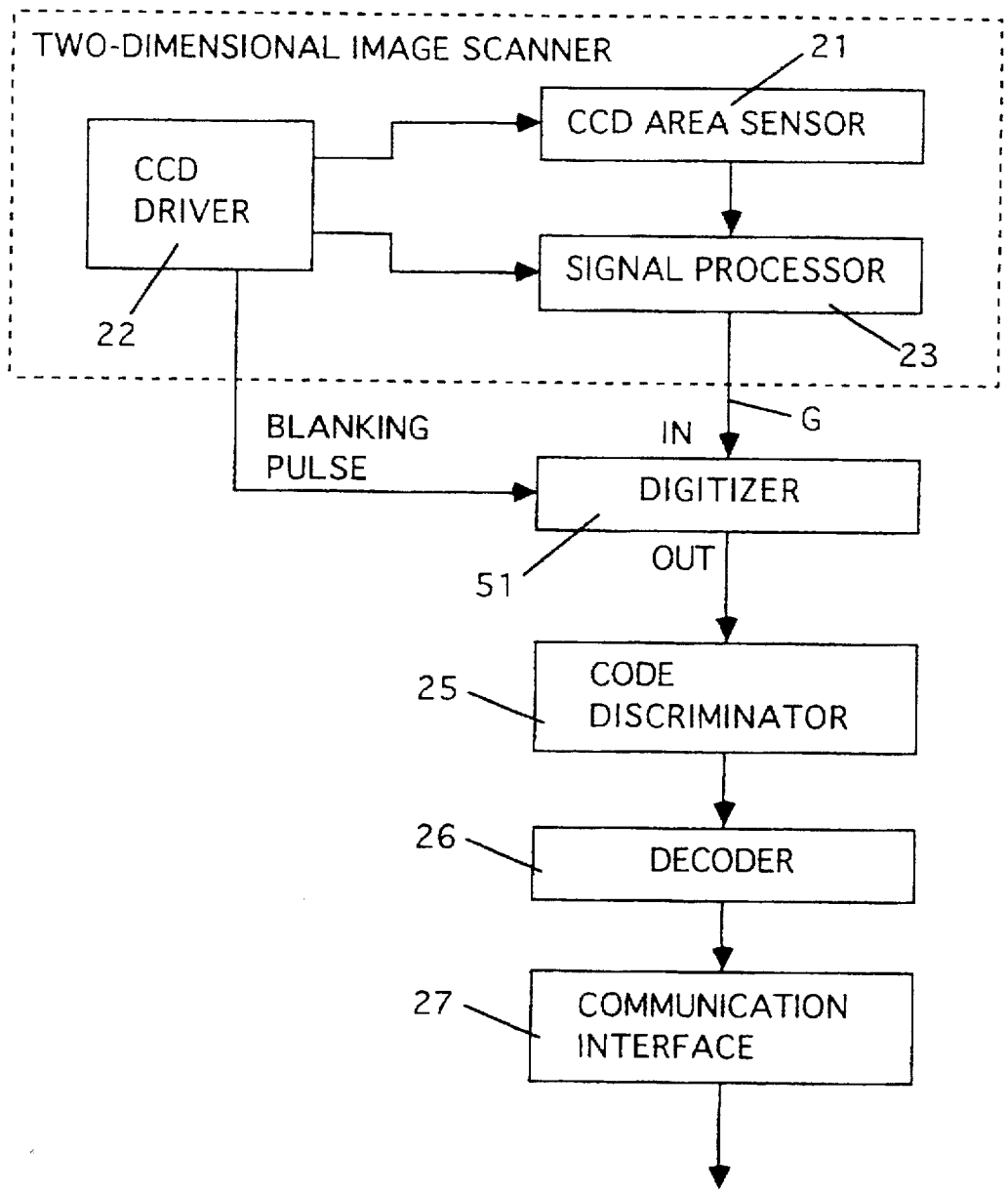
FIG. 7 is a block diagram of another scanner for reading the two-dimensional code as shown in FIG. 3.

When the two-dimensional pattern as shown in FIG. 3 is read by area sensor 21 of FIG. 7, the video signal output from signal processor 23 has a waveform as shown in FIG. 6. More specifically, the video signal contains blanking period K inserted between the preceding image data period H and the subsequent image data period J.

In period H, the level of detection signal G is higher than voltage Vx, so that switches 36 and 40 are turned on. In this case, the function of the circuit in FIG. 5 is the same as that in FIG. 1. Thus, the level of reference signal L follows the moderate and rapid changes in detection signal G, and comparator 31 can digitize the detection signal G with this reference signal L.

In period K, the level of detection signal G becomes lower than voltage Vx, so that switches 36 and 40 are turned off. In this case, the level of reference signal L is fixed and the digitization of signal G is performed with this fixed L.

Note that the image data of blanking period K represents a complete black level (optical black). Further, the video signal (or detection signal G) at horizontal sync signal period P has a specific level lower than the level at the front and back porches M, N in blanking period K. Since comparator 47 should detect the signal at period K, the value of voltage Vx is selected to be slightly higher than the front or back porch level (=completely black level).

In period J, the level of detection signal G is higher than voltage Vx, so that switches 36 and 40 are turned on. In this case, the function of the circuit in FIG. 5 is the same as that in FIG. 1, and comparator 31 can digitize the detection signal G with variable reference signal L which follows the moderate and rapid changes in detection signal G.

In short, according to the embodiment of FIG. 5, if the signal level of detection signal G becomes a complete black level or less, the feature of using variable reference signal L is disabled so that the operation of comparator 31 becomes stable with respect to such a complete black level.

FIG. 7 is a block diagram of another scanner for reading the two-dimensional code. FIG. 7 differs from FIG. 4 with respect to the circuit configuration of digitizer 51 whose operation depends on a blanking pulse from CCD driver 22.

In this embodiment, CCD driver 22 controls area sensor 21 and signal processor 23 so that the detection signal (G) has a signal form of a video signal. Driver 22 generates a blanking pulse each time the one line scanning in area sensor 21 is completed. The blanking period (K) shown in FIG. 6 is defined by the blanking pulse, and this pulse is supplied to digitizer 51.

Figure 8:
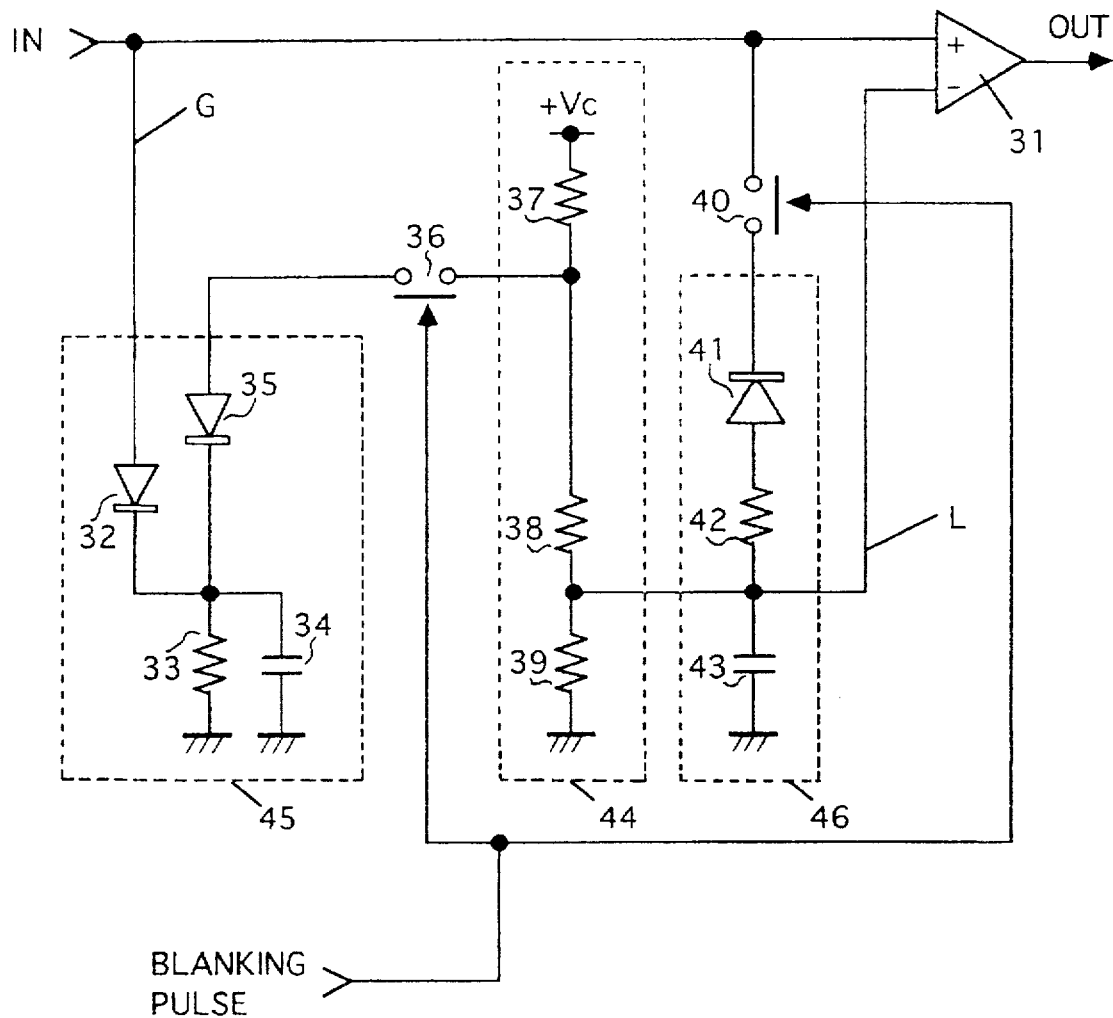
FIG. 8 is a circuit diagram of a digitizer according to a third embodiment of the invention.

FIG. 8 is a circuit diagram of digitizer 51 shown in FIG. 7. The circuit configuration of FIG. 8 differs from that of FIG. 5 in that voltage change detector 50 of FIG. 5 is removed, and in that the blanking pulse from CCD driver 22 is used in place of the output from detector 50.

According to the embodiment of FIG. 5 or 8, even if an extremely large level change (to a complete black level) occurs, comparator 31 can accurately digitize the input detection signal (G).

Although the present invention has been explained with reference to several embodiments using a CCD scanner, the present invention (the circuit of FIG. 1, 5, or 8) can be utilized in a case wherein a laser scanner is used.

What is claimed is:

1. A digitizer for digitizing an analog input, comprising:

a generator for generating a reference level;

a comparator, coupled to said generator, for comparing a signal level of the analog input with the reference level to provide a digitized output;

a first detector, coupled to said generator, for detecting a moderate rate of change in the signal level of the analog input, and for changing the reference level in accordance with the detected moderate rate of change in the signal level of the analog input;

a second detector, coupled to said generator, for detecting a rapid rate of change in the signal level of the analog input, and for changing the reference level in accordance with the detected rapid rate of change in the signal level of the analog input; and an isolator, coupled to said generator and said first detector, for isolating said generator from said first detector only when the signal level of the analog input exceeds a predetermined value.

2. A digitizer for digitizing an analog input, comprising:

a generator for generating a reference level;

a comparator, coupled to said generator, for comparing a signal level of the analog input with the reference level to provide a digitized output;

a first detector, coupled to said generator, for detecting a moderate rate of chance in the signal level of the analog input, and for changing the reference level in accordance with the detected moderate rate of change in the signal level of the analog input;

a second detector, coupled to said generator, for detecting a rapid rate of chance in the signal level of the analog input, and for changing the reference level in accordance with the detected rapid rate of change in the signal level of the analog input; and a first separator, coupled to said generator and said first detector, for separating said generator from said first detector only when the signal level of the analog input reaches a predetermined blanking level at which the reference level of said generator is insensitive to the moderate rate of change in the signal level of the analog input.

3. The digitizer of claim 2, further comprising:

a second separator, coupled to said second detector and an analog input circuit, for separating said second detector from the analog input circuit only when the signal level of the analog input reaches a predetermined blanking level at which the reference level of said generator is insensitive to the rapid rate of change in the signal level of the analog input.

4. A digitizer for digitizing an analog input comprising:

a generator for generating a reference level;

a comparator coupled to said generator, for comparing a signal level of the analog input with the reference level to provide a digitized output;

a first detector, coupled to said generator, for detecting a moderate rate of chance in the signal level of the analog input, and for chancing the reference level in accordance with the detected moderate rate of change in the signal level of the analog input;

second detector, coupled to said generator, for detecting a rapid rate of chance in the signal level of the analog input, and for chancing the reference level in accordance with the detected rapid rate of chance in the signal level of the analog input; and a first separator, coupled to said generator and said first detector, for separating said generator from said first detector during a predetermined blanking period in which the reference level of said generator is insensitive to the moderate rate of change in the signal level of the analog input.

5. The digitizer of claim 4, further comprising:

a second separator, coupled to said second detector and an analog input circuit, for separating said second detector from the analog input circuit during a predetermined blanking period in which the reference level of said generator is insensitive to the rapid rate of change in the signal level of the analog input.

6. A digitizer for digitizing an analog input, comprising:

a generator for generating a reference level;

a comparator, coupled to said generator, for comparing a signal level of the analog input with the reference level to provide a digitized output;

a first detector, coupled to said generator, for detecting a moderate rate of change in the signal level of the analog input, and for changing the reference level in accordance with the detected moderate rate of chance in the signal level of the analog input:

a second detector, coupled to said generator for detecting a rapid rate of change in the signal level of the analog input, and for chancing the reference level in accordance with the detected rapid rate of change in the signal level of the analog input; and wherein said first detector comprises a low-pass filter having a specific time constant selected such that the reference level of said generator is insensitive to the rapid rate of change in the level of the analog input but is sensitive to the moderate rate of change in the level of the analog input.

7. A digitizer for digitizing an analog input, comprising:

a generator for generating a reference level;

a comparator, coupled to said generator, for comparing a signal level of the analog input with the reference level to provide a digitized output;

a first detector, coupled to said generator, for detecting a moderate rate of chance in the signal level of the analog input, and for changing the reference level in accordance with the detected moderate rate of chance in the signal level of the analog input;

a second detector, coupled to said generator, for detecting a rapid rate of change in the signal level of the analog input, and for changing the reference level in accordance with the detected rapid rate of chance in the signal level of the analog input; and wherein said second detector comprises a high-cut filter having a prescribed time constant selected such that the reference level of said generator is insensitive to higher frequency noise components mixed in the analog input but is sensitive to the rapid rate of change in the level of the analog input.

8. A digitizer for digitizing an analog input, comprising:

a generator for generating a reference level;

a comparator, coupled to said generator, for comparing a signal level of the analog input with the reference level to provide a digitized output;

a first detector, coupled to said generator, for detecting a moderate rate of change in the signal level of the analog input, and for changing the reference level in accordance with the detected moderate rate of chance in the signal level of the analog input;

a second detector, coupled to said generator, for detecting a rapid rate of chance in the signal level of the analog input, and for changing the reference level in accordance with the detected rapid rate of change in the signal level of the analog input; and a separator, coupled to said generator, said first detector and an analog input circuit, for separating said generator from said first detector as well as separating said second detector from the analog input circuit only when the signal level of the analog input reaches a predetermined blanking level at which the reference level of said generator is insensitive to the moderate rate of change in the signal level of the analog input.

9. The digitizer of claim 8, wherein said separator comprises:

a reference potential generator for providing a predetermined reference potential;

a comparator for comparing the signal level of the analog input with the predetermined reference potential to generate a switch signal when the signal level of the analog input exceeds the predetermined reference potential;

a first switch for disconnecting said generator from said first detector when the switch signal is generated by said comparator; and a second switch for disconnecting said generator from the analog input circuit when the switch signal is generated by said comparator.

10. The digitizer of claim 8, wherein the analog input comprises a video signal which contains periodical blanking portions, and wherein said separator comprises:

a first switch, responsive to each of the blanking portions, for disconnecting said generator from said first detector during the blanking portions; and a second switch, responsive to each of the blanking portions, for disconnecting said generator from the circuit of the analog input during the blanking portions.

11. A digitizer for digitizing an analog input, comprising:

means for generating a reference level;

comparing means, coupled to said generating means, for comparing a signal level of the analog input with the reference level to provide a digitized output;

first detecting means, coupled to said generating means, for detecting a moderate change in the signal level of the analog input so as to change the reference level in accordance with the detected moderate change in the signal level of the analog input;

second detecting means, coupled to said generating means, for detecting a rapid change in the signal level of the analog input so as to change the reference level in accordance with the detected rapid change in the signal level of the analog input;

isolating means, coupled to said generating means and said first detecting means, for isolating said generating means from said first detecting means only when the signal level of the analog input exceeds a predetermined value; and separating means, coupled to said generating means and said first detecting means, for separating said generating means from said first detecting means only when the signal level of the analog input reaches a predetermined blanking level at which the reference level of said generating means is insensitive to the moderate change in the signal level of the analog input.

12. A digitizer for digitizing an analog input, comprising:

means for generating a reference level;

comparing means, coupled to said generating means, for comparing a signal level of the analog input with the reference level to provide a digitized output;

first detecting means, coupled to said generating means, for detecting a moderate change in the signal level of the analog input so as to change the reference level in accordance with the detected moderate change in the signal level of the analog input;

second detecting means, coupled to said generating means, for detecting a rapid change in the signal level of the analog input so as to change the reference level in accordance with the detected rapid change in the signal level of the analog input;

isolating means, coupled to said generating means and said first detecting means, for isolating said generating means from said first detecting means only when the signal level of the analog input exceeds a predetermined value; and separating means, coupled to said generating means and said first detecting means, for separating said generating means from said first detecting means during a predetermined blanking period in which the reference level of said generating means is insensitive to the moderate change in the signal level of the analog input.

13. A digitizer for digitizing an analog input, comprising:

means for generating a reference level;

comparing means, coupled to said generating means, for comparing a signal level of the analog input with the reference level to provide a digitized output;

first detecting means, coupled to said generating means, for detecting a moderate change in the signal level of the analog input so as to change the reference level in accordance with the detected moderate change in the signal level of the analog input;

second detecting means, coupled to said generating means, for detecting a rapid change in the signal level of the analog input so as to change the reference level in accordance with the detected rapid change in the signal level of the analog input;

isolating means, coupled to said generating means and said first detecting means, for isolating said generating means from said first detecting means only when the signal level of the analog input exceeds a predetermined value; and separating means, coupled to said generating means, said first detecting means and a circuit of the analog input, for separating said generating means from said first detecting means as well as separating said second detecting means from the analog input circuit only when the signal level of the analog input reaches a predetermined blanking level at which the reference level of said generating means is insensitive to the moderate change in the signal level of the analog input.

14. A digitizer for digitizing an analog input, comprising:

means for generating a reference level;

comparing means, coupled to said generating means, for comparing a signal level of the analog input with the reference level to provide a digitized output;

first detecting means, coupled to said generating means, for detecting a moderate change in the signal level of the analog input so as to change the reference level in accordance with the detected moderate change in the signal level of the analog input; and second detecting means, coupled to said generating means, for detecting a rapid change in the signal level of the analog input so as to change the reference level in accordance with the detected rapid change in the signal level of the analog input, wherein said first detecting means includes a low-pass filter having a specific time constant selected such that the reference level of said generating means is insensitive to the rapid change in the level of the analog input but is sensitive to the moderate change in the level of the analog input, and said second detecting means includes a high-cut filter having a prescribed time constant selected such that the reference level of said generating means is insensitive to higher frequency noise components mixed in the analog input but is sensitive to the rapid change in the level of the analog input.

* * * * *